United States Patent
Smith

(10) Patent No.: US 7,683,772 B2
(45) Date of Patent: Mar. 23, 2010

(54) INTEGRATED LED WARNING AND VEHICLE LAMP

(75) Inventor: Todd J. Smith, Deep River, CT (US)

(73) Assignee: Whelen Engineering Company, Inc., Chester, CT (US)

(*) Notice: Subject to any disclaimer, the term of this patent is extended or adjusted under 35 U.S.C. 154(b) by 612 days.

(21) Appl. No.: 11/634,533

(22) Filed: Dec. 6, 2006

(65) Prior Publication Data

US 2007/0080645 A1  Apr. 12, 2007

Related U.S. Application Data

(63) Continuation-in-part of application No. 10/912,278, filed on Aug. 5, 2004, now Pat. No. 7,158,019.

(51) Int. Cl.
*B60Q 1/52* (2006.01)

(52) U.S. Cl. .............. 340/471; 340/475; 340/467; 340/439; 362/555; 362/237; 362/303; 315/292; 315/294; 315/312

(58) Field of Classification Search ............. 340/471, 340/467, 475, 439; 362/555, 303, 237; 315/292, 315/294, 312
See application file for complete search history.

(56) References Cited

U.S. PATENT DOCUMENTS

| | | | |
|---|---|---|---|
| 4,211,955 A | 7/1980 | Ray | |
| 4,298,869 A | 11/1981 | Okuno | |
| 4,654,629 A | 3/1987 | Bezos et al. | |
| 4,868,719 A | 9/1989 | Kouchi et al. | |
| 5,426,414 A | 6/1995 | Flatin et al. | |
| 5,806,965 A | 9/1998 | Deese | |
| 6,380,865 B1 | 4/2002 | Pederson | |
| 6,462,669 B1 | 10/2002 | Pederson | |
| 6,787,999 B2 * | 9/2004 | Stimac et al. | 315/51 |
| 6,796,698 B2 | 9/2004 | Sommers et al. | |
| 6,940,660 B2 | 9/2005 | Blumel | |
| 6,989,743 B2 | 1/2006 | Pederson | |
| 7,520,634 B2 * | 4/2009 | Ducharme et al. | 362/276 |

* cited by examiner

*Primary Examiner*—Tai T Nguyen
(74) *Attorney, Agent, or Firm*—Alix, Yale & Ristas, LLP

(57) ABSTRACT

An integrated LED warning and vehicle lamp has a base configured to replace an existing vehicle lamp by reception into the lamp's reflector shell. The integrated warning and vehicle lamp includes first and second arrays of LEDs arranged on a support projecting from the base. One array is used to reproduce the vehicle signal and the second array provides a warning light signal. A collimator organizes light from one or more LED in a direction aligned with the intended direction of light emission from the vehicle lamp. An interface electrical circuit connects one array of LEDs to the vehicle electrical system. A warning signal electrical circuit energizes the other array to produce a variety of warning signals and/or illumination patterns.

26 Claims, 10 Drawing Sheets

INTEGRATED LED WARNING AND VEHICLE LAMP

CROSS REFERENCE TO RELATED APPLICATION

This application is a continuation-in-part of U.S. patent application Ser. No. 10/912,278 filed Aug. 5, 2004 now U.S. Pat. No. 7,158,019.

TECHNICAL FIELD

The present disclosure generally relates to vehicular emergency warning lights used to warn the public of the presence of an emergency vehicle and more particularly to a lamp which integrates a warning signal function with the functions of a standard vehicular lamp.

BACKGROUND

The use of emergency vehicle signal devices for increasing the visibility of public service vehicles is well known in the art. Vehicles using such devices include emergency, police, municipal, and construction vehicles, among others. The most widely employed type of visual warning system is the roof-mounted light bar. Such a light bar includes a plurality of light generators arranged on a support that spans from side-to-side, and either rests upon or is spaced above, the roof of the emergency vehicle. While such light bars accomplish the purpose of producing a wide variety of highly visible light radiation patterns to warn the public of the presence of an emergency vehicle, prior art light bars possess certain inherent disadvantages. For example, such prior light bars tend to increase vehicle wind resistance, increase fuel consumption and produce turbulence that results in interior noise at high speeds. A traditional light bar also increases vehicle height, which may limit access to certain areas, or present the possibility of damage to property or the light bar itself where there is limited overhead clearance. Arguably the most significant drawback to a roof-mounted light bar in the context of law enforcement vehicles is that the presence of a light bar conspicuously identifies the nature of the vehicle.

The prior art discloses aerodynamic light bars, low profile light bars and light bars mounted against the inside of vehicle windows that address some of the disadvantages of traditional roof mounted light bars. Other alternative configurations include various combinations of grill or bumper-mounted warning lights, headlight flashers, warning lights mounted inside the vehicle on the dashboard, sun visors or rearview mirror, and warning lights integrated with the externally mounted rearview mirrors. With respect to warning lights placed inside the vehicle, vision at night can be problematic, due to reflection of the light into the interior of the vehicle.

Another approach to providing an inconspicuous warning light is to place a strobe warning lamp in the reflector shells for the front and rear corner signal/running lamps. This has typically been accomplished by drilling a second opening in the reflector and installing a strobe base and bulb to project into the shell. One drawback of this procedure is the need to modify parts of the vehicle. Further, the strobe lamp cannot be arranged at the focus of the reflector and is thus rendered significantly less effective in its warning function. Strobe-type lamps are known to be relatively short lived and require frequent maintenance.

The use of LED's in warning and signaling lights is well known. Older models of LED's produced limited quantities of light over a relatively narrow viewing angle centered around an optical axis of the LED. These LED's were typically massed in compact arrays to fill the given illuminated area and provide the necessary light output. Modern LED's produce significantly greater luminous flux per component, permitting fewer LED's to produce the luminous flux required for many warning and signaling applications. It is known to arrange a small number of high-output LED's in a light fixture and provide each high-output LED with an internally reflecting collimating lens. The collimating lens gathers light from the LED into a collimated beam centered on the LED optical axis. Such an arrangement typically does not fill the light fixture, resulting in an undesirable appearance consisting of bright spots arranged against an unlit background. Light-spreading optical features on the outside lens/cover are sometimes employed to improve the appearance of the light fixture.

There is a continuing need for a new and improved emergency vehicle signal light that provides high visibility for an emergency vehicle while overcoming the disadvantages discussed above. The emergency vehicle light is preferably energy efficient and requires little or no maintenance.

SUMMARY

Briefly stated, according to one exemplary embodiment, an integrated lamp may include a base configured for insertion in the aperture of a reflector shell provided for a standard vehicle lamp. A lamp support post extends from the base to provide a support surface for multiple light emitters. In one exemplary embodiment, the light emitters are arranged in two parallel circumferential arrays. One array is dedicated to producing the vehicle signal and/or illumination formerly produced by the standard vehicle lamp. The other array is dedicated to producing a warning light signal. The light emitters in the two arrays are positioned with their respective optical axes substantially perpendicular to a longitudinal axis of the lamp support post. An integrated lamp according to one embodiment may include an axially oriented light emitter secured to the end of the lamp support post. The axial light emitter may be provided with a collimator to organize its light to a path aligned with the longitudinal axis of the lamp support post. The axial light emitter is electrically connected to the array producing the warning light signal, thereby enhancing the straight-ahead intensity of the warning light signal.

According to another exemplary embodiment a lamp assembly may include a base, a support post, a first array of LEDs equidistant from said base, and a second array of LEDs between the first array and the base. A plurality of side emitting collimating lenses may cover at least a portion of said first array of LEDs equidistant from said base.

According to a further exemplary embodiment, a lamp assembly may include a base, a support post extending from said base defining a longitudinal axis and having an outside surface, a plurality of radial light emitters, each having an optical axis and secured to the outside surface of the support with their optical axes substantially perpendicular to said longitudinal axis, each said radial light emitter producing light when energized in a symmetrical pattern about said optical axis and a lens constructed and arranged to redirect a portion of the light emitted from at least one of said radial light emitters in a direction that is substantially parallel to said longitudinal axis.

According to yet another exemplary embodiment, an integrated lamp may include a base. A support post extends from the base to provide a support surface for a plurality of radially directed light emitters. In this embodiment, the radially oriented light emitters are arranged in two arrays, the LEDs in each array being equidistant from the base. One array may be dedicated to producing the vehicle signal and/or illumination formerly produced by the standard vehicle lamp. The other array may be dedicated to producing a warning light signal. The light emitters in the two arrays are positioned with their respective optical axes substantially perpendicular to a longitudinal axis of the support post. One array of light emitters is provided with lenses to re-direct a portion of the light produced by each emitter into a path that is substantially parallel to the longitudinal axis of the support post. According to aspects of an embodiment, the lenses are positioned to re-direct light from the array producing the warning light signal, thereby enhancing the straight-ahead intensity of the warning light signal. The remainder of light produced by this array of emitters is allowed to reflect off the reflector shell.

The radial light emitters are preferably high output LEDs and an aspect of an embodiment relates to an interface electrical circuit between the vehicle electrical system and the integrated lamp. The interface electrical circuit modifies the electrical power provided to the vehicle lamp to a form appropriate for the LEDs. A separate warning signal electrical circuit energizes the LEDs dedicated to generating the warning light signal. The warning signal electrical circuit may be centralized or each integrated lamp may be provided with its own warning signal electrical circuit. The warning light signals may be coordinated or asynchronous, according to the preference of the user.

DETAILED DESCRIPTION

Figure 1:
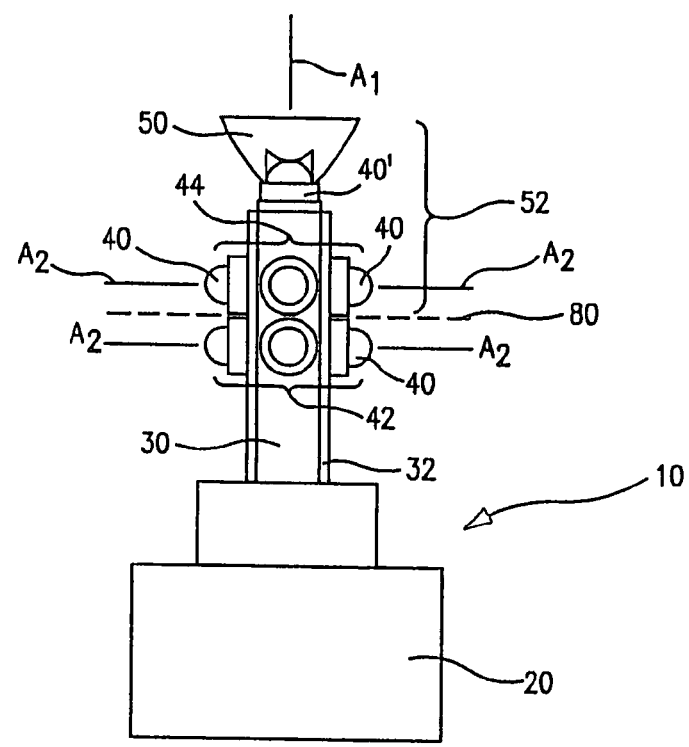
FIG. 1 is a side view of one embodiment of an integrated lamp according to aspects of the disclosure.
Figure 2:
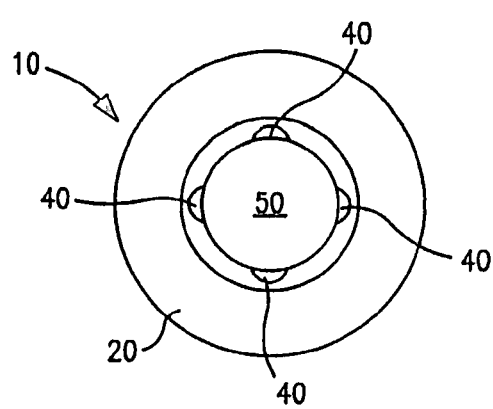
FIG. 2 is a top view of the integrated lamp of FIG. 1.
Figure 3:
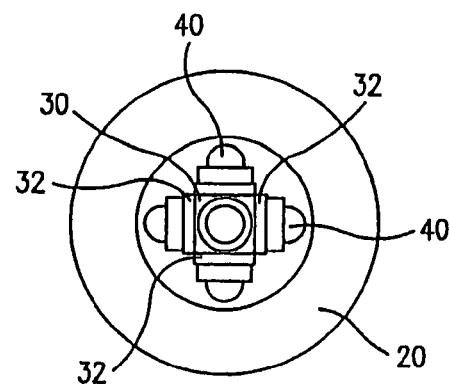
FIG. 3 is a top view of the integrated lamp of FIG. 1, with the collimating lens 50 removed for clarity.

A first exemplary embodiment of an integrated LED warning and vehicle lamp 10 will be described with reference to FIGS. 1-6. FIG. 1 is an enlarged side view of an integrated LED warning and vehicle lamp 10 (hereinafter "integrated lamp 10"). The integrated lamp 10 is configured to be a direct replacement for an existing vehicle signal lamp. "Direct replacement" in the context of this application means that the integrated lamp 10 is configured for installation in the reflector shell in place of a vehicle lamp and without modification of the reflector shell. The integrated lamp 10 is equipped with a base 20 configured for reception in the hole 92 provided in the reflector shell 90 for the vehicle lamp being replaced. Lamp bases are typically received in the hole and secured by a bayonet connection or the like. The integrated lamp 10 has a physical structure compatible with the interior volume and focal characteristics of the reflector shell. These aspects allow installation of the integrated lamp 10 in place of an existing vehicle lamp without physical modification to the vehicle. Integrating the warning signal function with the vehicle signal function(s) of the lamp being replaced on the same physical structure permits the light emitters for producing the warning and vehicle signals to be arranged at or close to the focus of the reflecting surface of the reflector shell.

Figure 4:
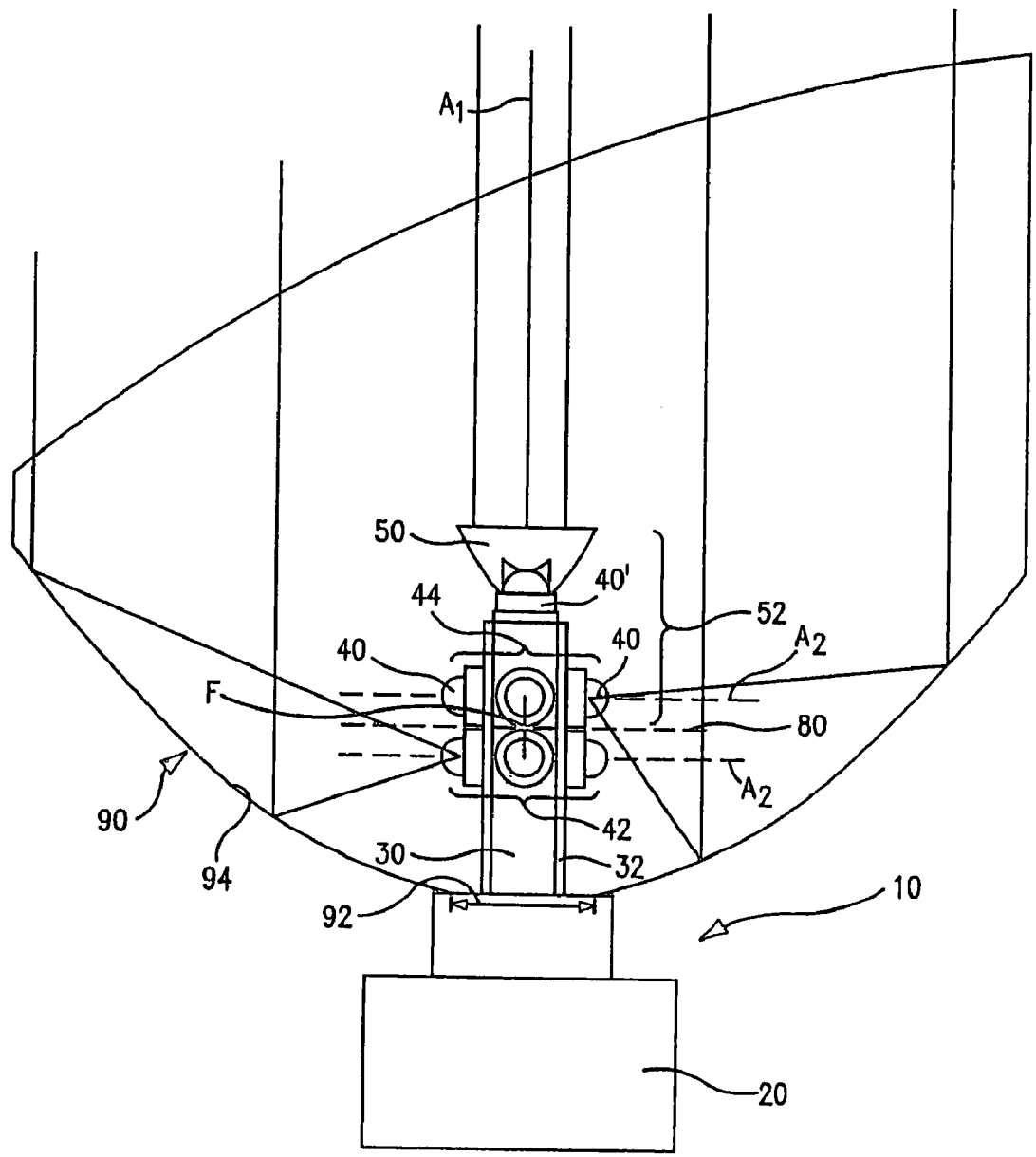
FIG. 4 is a side sectional view through a representative reflector shield and an installed integrated.

With reference to FIGS. 1 and 4, a lamp support post 30 extends from a base 20 to provide an attachment point for a plurality of light-emitting diodes 40. In the exemplary embodiment, the support post 30 is square in section and extends outwardly through the focal point F of the reflector shell 90. The outside surfaces of the support post 30 are substantially planar rectangular surfaces, the end of the support post 30 being a substantially planar square surface. It is desirable that the support post 30 be constructed from heat-transmissive material to function as a heat sink for the light-emitting diodes 40 attached thereto.

The LEDs 40 are high-output LEDs of the type manufactured by LUMILEDS® of San Jose, Calif. under the LUXEON® brand. LUXEON® LEDs come in a variety of lens configurations and colors. The illustrated LEDs are LUXEON® emitters having the lambertian or high-dome lens configuration. This lens configuration emits light in a symmetrical half-dome around an optical axis $A_1$, $A_2$ of the LED. The LEDs 40 emit light when energized by low-voltage direct current (DC). The light output of the LED increases with increasing current such that different levels of applied current will produce different levels of light output.

When energized, the LEDs 40 produce significant amounts of heat that must be removed to prevent overheating and damage to the LEDs. Heat removal is typically accomplished by securing the base or "slug" of the LED in heat-transmissive relationship to a heat-conductive PC board. Such a PC board may be a typical fiberboard provided with heat-conductive copper pads and through-holes or may be a metal-core PC board as is known in the art. The PC board is typically equipped with electrical leads for connecting the LED(s) to each other and to electrical circuits producing the energizing current.

It will be understood by those of skill in the art that the power requirements for the LEDs 40 of the integrated lamp 10 may be quite different from the power applied to the vehicle lamp being replaced. Further, modern vehicles may sense the presence or absence of continuity through the filament(s) of the vehicle lamp to provide indications of lamp malfunction. Therefore, it will likely be necessary to provide an interface electrical circuit between the integrated lamp 10 and the relevant vehicle electrical systems. The interface electrical circuit will modify vehicle power to the proper voltage and current for the LED(s). The interface electrical circuit may also mimic a properly functioning vehicle lamp to avoid spurious indications of lamp malfunction. The interface electrical circuit will be responsive to the vehicle signaling systems that formerly energized the vehicle lamp. To the vehicle, the integrated lamp 10 will appear and behave identically to the vehicle lamp being replaced.

An aspect of the present disclosure relates to the dual functionality of the integrated lamp 10. One function of the integrated lamp 10 is to duplicate the vehicle light signals such as turn signals, brake lights or running lights formerly generated by the vehicle lamp. The vehicle light signals and illumination produced by the integrated lamp must meet the light intensity and distribution pattern standards established for the relevant vehicle signals or lamps. The second function of the integrated lamp is to produce a warning signal illumination pattern meeting the intensity and distribution pattern requirements established for emergency vehicle warning light signals.

With reference to FIGS. 1 and 4, an exemplary integrated lamp 10 includes a total of nine high-output LEDs 40. Eight of the LEDs are mounted to the lamp support post in two circumferential rows 42, 44. Each row 42, 44 includes one LED 40 secured to each longitudinal face of the lamp support post 30. The row 42 of LEDs 40 closer to the base 20 is dedicated to replacing the vehicle signal functions, while the outward row 44 and axial LED 40' (together 52) are dedicated to generating the warning light signal. Dashed line 80 in FIGS. 1 and 4 indicates an approximate focal distance defined by a reflecting surface 94 of the reflector shell 90. An aspect of the present disclosure relates to placing the rows 42, 44 of radial LEDs 40 as close to the focus F of the reflector shell 90 as possible. The parallel rows 42, 44 of LEDs 40 are respectively placed immediately within and immediately beyond the focal distance 80 of the reflector shell.

An aspect of the present disclosure relates to placement of an axial LED 40' on the outward end of the lamp support post 30. This LED 40' is equipped with a collimating (internally reflecting) reflector 50 which organizes light from the axial LED 40' to a path substantially parallel to an axis $A_1$ defined by the lamp support post 30. The path of the collimated light from the axial LED 40' is also substantially parallel to the optical axis $A_1$ of the axial LED 40'. The four radial light emitters 40 of row 44 fill the vehicle reflector with light when energized to generate the warning light signal. The axial LED 40' is typically energized simultaneously with the radial LEDs of row 44 to provide additional straight-ahead intensity to the generated warning light signal. The LEDs 52 connected to generate the warning light signal are energized in a selected pattern at current levels equal to or slightly above the maximum rated average current $I_{max}$ for the LEDs. $I_{max}$ is typically between approximately 350 mA and 450 mA for a one-watt LUXEON® emitter depending on the color and batch. The LEDs are mounted with their slugs in heat-transmissive relationship to heat-conductive PC boards 32, which are in turn secured to the lamp support post 30 in heat-transmissive relationship. This arrangement removes heat from the LEDs 40, 40' efficiently, preventing overheating, and allowing the application of maximum current to the LEDs.

The four LEDs 40 of the inward row 42 are electrically connected to the relevant vehicle systems via an interface electrical circuit 60. The interface electrical circuit 60 responds to the vehicle systems to provide an appropriate energizing current to the LEDs of the inner row 42 in a pattern to reproduce the relevant vehicle signal. For example, to reproduce a turn signal, the LEDs are provided with maximum current $I_{max}$ in an equally timed on/off sequence. To reproduce running lights, the LEDs are continuously energized at a less than maximum current. To reproduce a brake signal, the LEDs 40 are provided with maximum current for as long as the brake signal is transmitted from the relevant vehicle system. Dual functions, such as running and brake lights, can be reproduced by applying continuous lower current with intermittent maximum current to the LEDs 40 of row 42.

Figure 5:
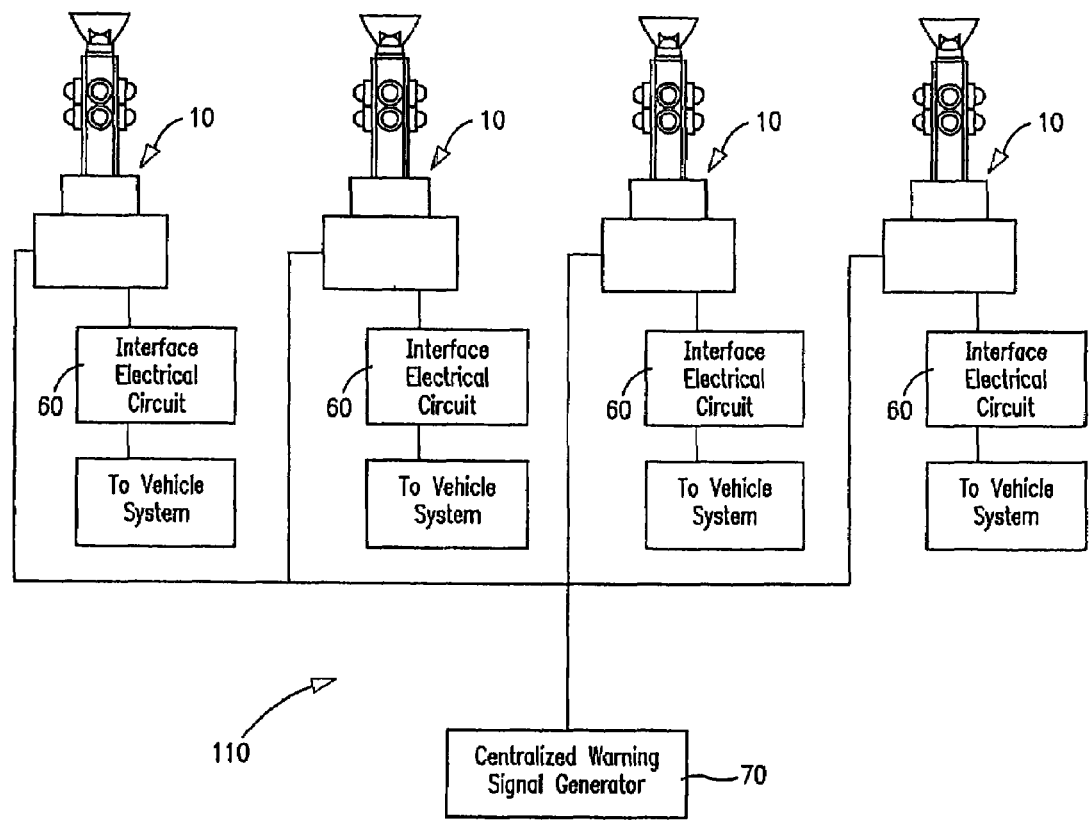
FIG. 5 is a functional block diagram of an exemplary integrated vehicular lamp and warning light system.
Figure 6:
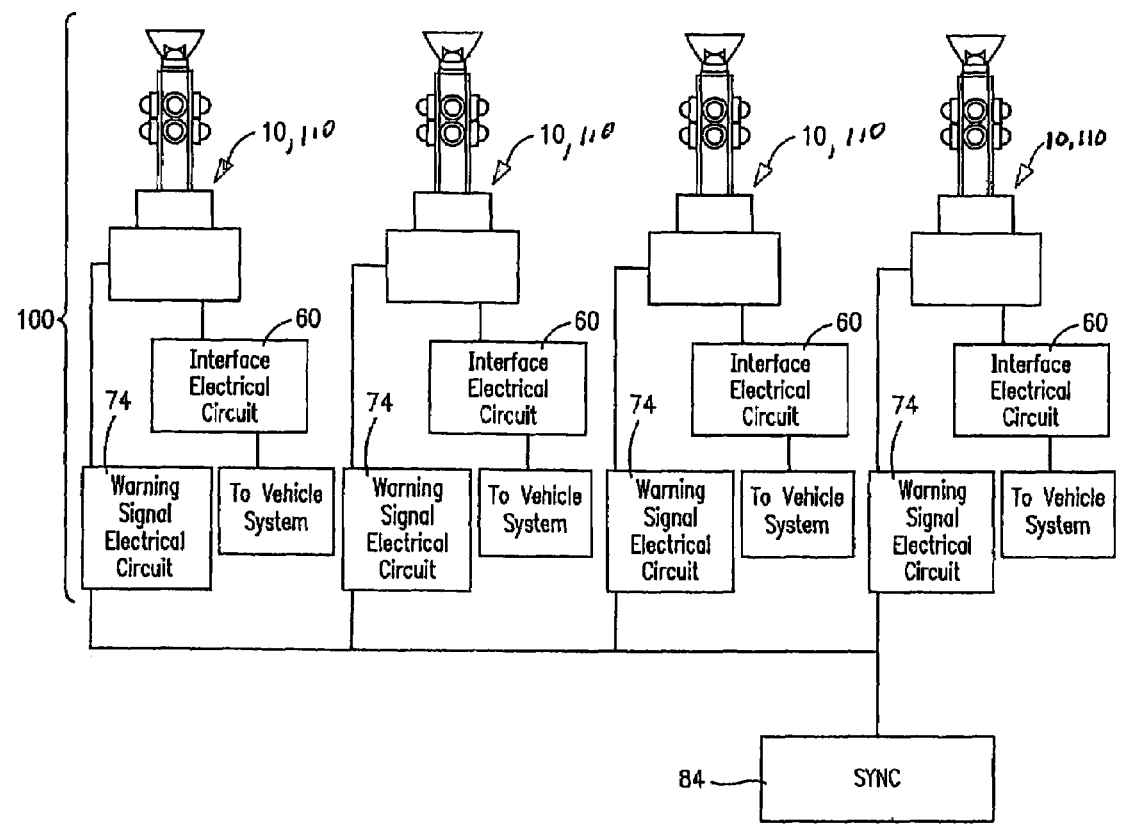
FIG. 6 is a functional block diagram of an alternative exemplary integrated vehicular lamp and warning light system.

With reference to FIGS. 5 and 6, there are a variety of ways to construct the electrical circuitry and connections to coordinate the light signals generated by the integrated lamp 10 with the light signals of the other integrated lamps and relevant vehicle systems. FIG. 5 illustrates a first embodiment of an integrated vehicular lamp and warning system light system 110. In the arrangement of FIG. 5, a centralized warning signal generator 70 generates a coordinated set of electrical signals that are transmitted to the LEDs of the integrated lamps 10. The centralized generation and distribution of electrical signals to multiple warning signal light generators is known in the art. This arrangement produces a coordinated warning signal light pattern from the multiple integrated lamps 10. It will be noted that each of the integrated lamps 10 in FIG. 5 is also provided with an interface electrical circuit 60. The interface electrical circuit 60 provides appropriate levels of energizing current to some of the integrated lamp LEDs 40 in patterns to reproduce the relevant vehicle signal as described above.

FIG. 6 illustrates an alternative integrated vehicular lamp and warning signal light system 100 in which each integrated lamp 10 is provided with its own warning signal electrical circuit 74. The individual warning signal electrical circuits may comprise a microcontroller programmed with one or more warning light signal patterns and the circuitry necessary to generate energizing current to produce the relevant warning light signal. The warning signal electrical circuits 74 will typically be configured to generate the same or complementary warning light signals when energized. FIG. 6 shows a synchronizing electrical connection 84 between the several integrated lamps 10. Such a synchronizing electrical connection 84 can be employed to coordinate the timing of the warning light signals generated by the integrated lamps 10. Alternatively, the integrated lamps 10 may be permitted to generate their warning light signals without reference to the signals generated by the other integrated lamps 10. The integrated lamps 10 of FIG. 6 are also provided with interface electrical circuits 60 that function as described above.

Figure 7:
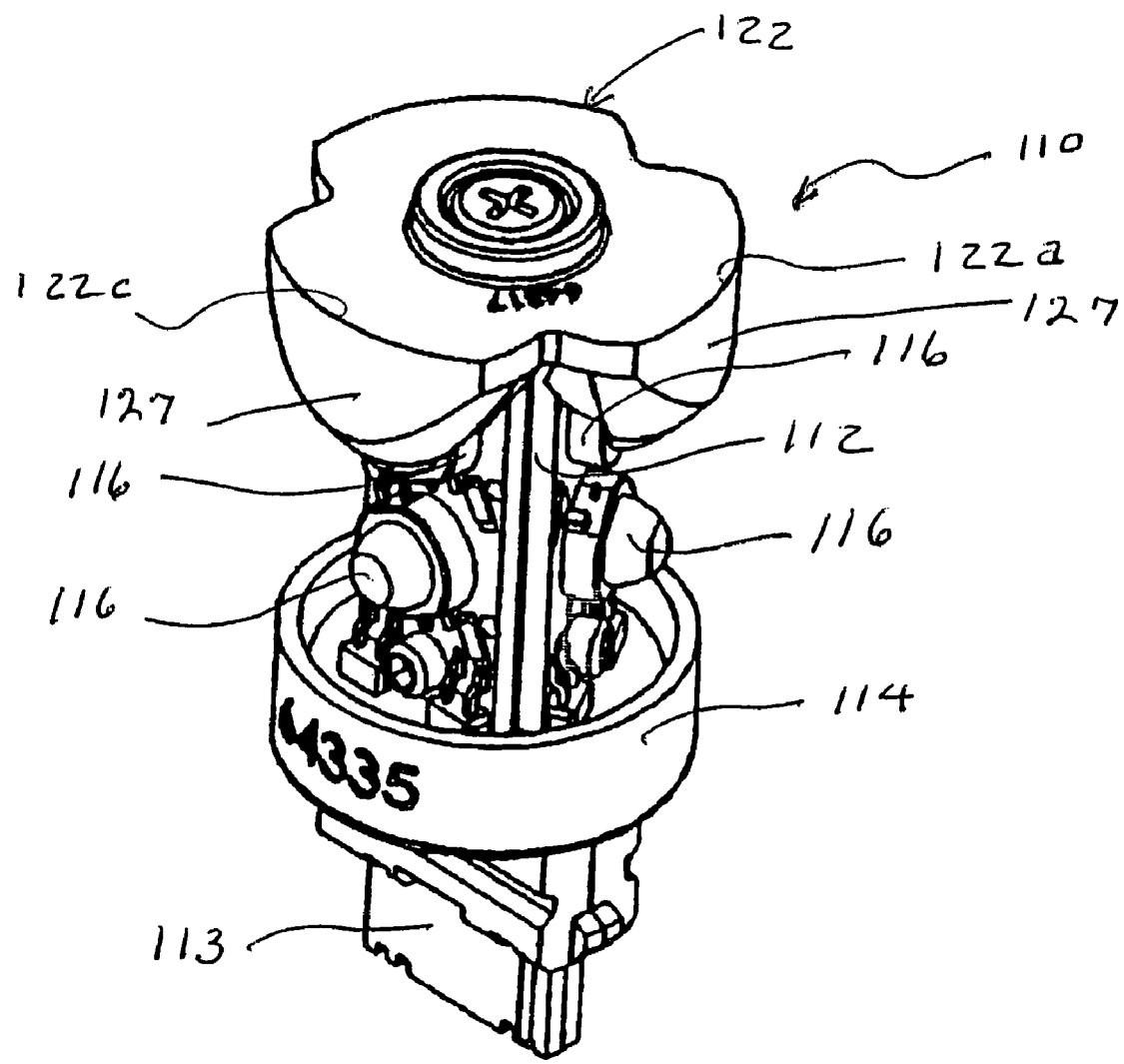
FIG. 7 is an perspective view of a second embodiment of an integrated lamp.

Another embodiment of an integrated LED warning and vehicle lamp 110 will be described with reference to the FIGS. 7-14. FIG. 7 is a perspective view of this embodiment of an integrated LED warning and vehicle lamp (hereinafter "integrated lamp 110"). As with the previous embodiment, the integrated lamp 110 is configured to be a direct replacement for an existing vehicle lamp. As explained before, in the context of this application, the phrase "direct replacement" means that the integrated lamp 110 is configured for installation in the reflector shell 190 of a traditional vehicle lamp without modification of the reflector shell 190. The integrated lamp 110 is equipped with a plug 113, generally rectangular in cross-section, extending from the base 114 and adapted to be received in a socket. The socket may be of the type configured for connection to the reflector shell 190 by a bayonet connection or the like.

The integrated lamp 110 has a physical structure compatible with the interior volume and focal characteristics of the reflector shell 190. These aspects of the disclosure permit the installation of the integrated lamp 110 in place of an existing vehicle lamp without physical modification to the vehicle. The warning signal function is also integrated with the vehicle signal function(s) on the same physical structure, namely the integrated lamp 10. This allows for the radial light emitters producing the warning and vehicle signals to be arranged at or close to the focus of the reflecting surface of the reflector shell.

Figure 12:
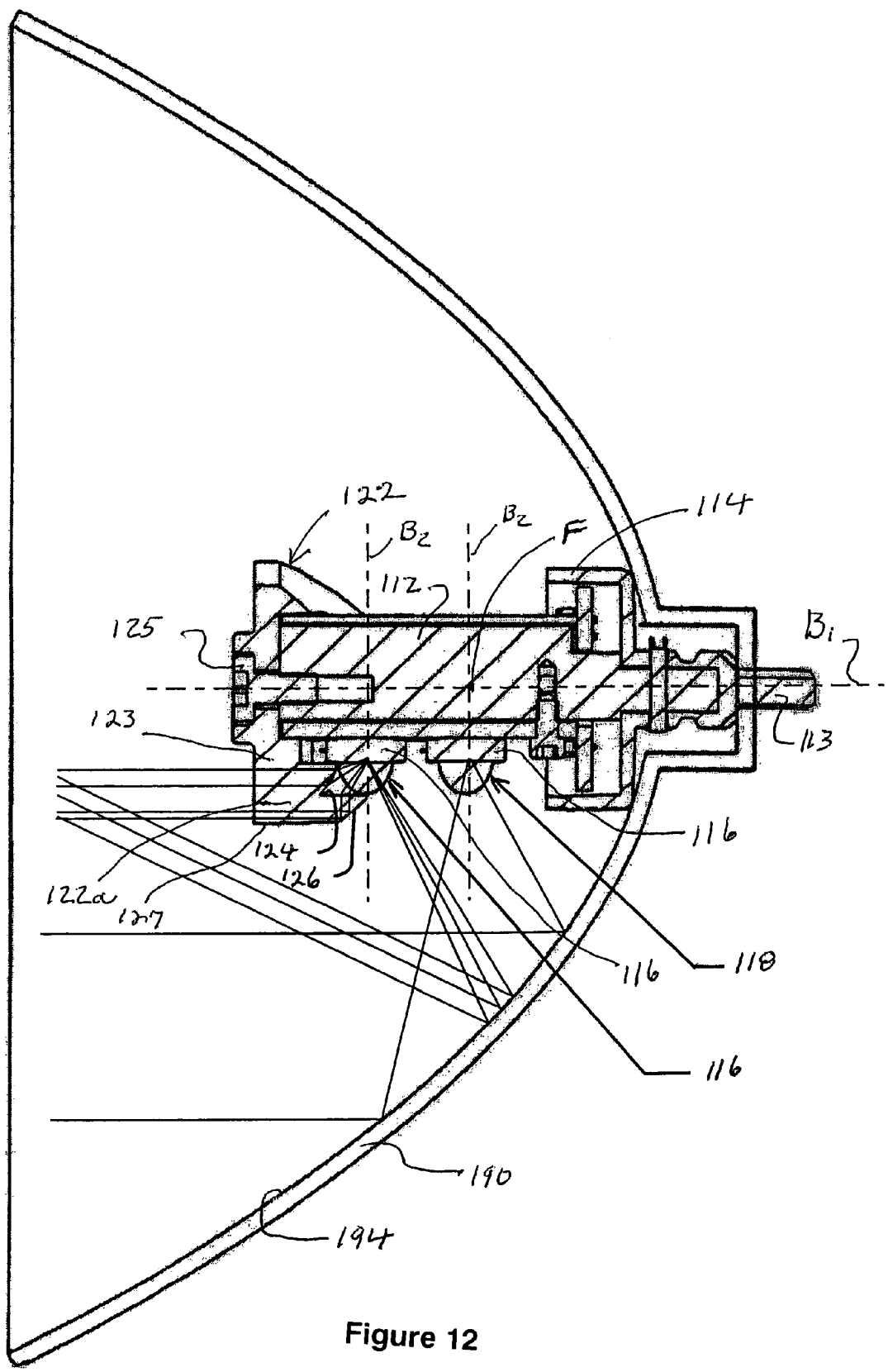
FIG. 12 is side sectional view through a representative reflector shell with the integrated lamp of FIG. 7 installed therein.

With reference to FIGS. 7, 8, 11 and 12, a support post 112 extends from the base 114 to provide an attachment point for a plurality of light-emitting diodes 116. In this exemplary embodiment, the support post 112 is triangular in cross-section and extends outwardly through the focal point F of the reflector shell 190 when mounted in the reflector shell 190 as shown in FIG. 12. The three outside surfaces 117 of the support post 112 are substantially planar surfaces. It is desirable that the support post 112 be constructed from heat-transmissive material to function as a heat sink for the light-emitting diodes 116 attached thereto.

The LEDs 116 of the exemplary embodiments are high-output LEDs of the type manufactured by LUMILEDS® of San Jose, Calif. under the LUXEON® brand. LUXEON® LEDs come in a variety of lens configurations and colors. The illustrated LEDs are LUXEON® emitters having the lambertian or high-dome lens configuration. This lens configuration emits light in a symmetrical half-dome around an optical axis $B_2$ of the LED. The LEDs 116 emit light when energized by low-voltage direct current (DC). The light output of the LEDs 116 increases with increasing current such that different levels of applied current will produce different levels of light output. High output LEDs from other manufacturers may be compatible with the disclosed embodiments.

When energized, the LEDs 116 produce significant amounts of heat that must be removed to prevent overheating and damage to the LEDs 116. Heat removal is typically accomplished by securing the base or "slug" of the LEDs 116 in heat-transmissive relationship to a heat-conductive PC board 119. Such a PC board 119 may be a typical fiberboard provided with heat-conductive copper pads and through-holes or may be a metal-core PC board as is known in the art. The PC board 119 is typically equipped with electrical leads for connecting the LEDs 116 to each other and to electrical circuits producing the energizing current.

With reference to FIGS. 7-14, the exemplary integrated lamp 110 includes a total of six high-output LEDs 116. The LEDs 116 are mounted to the support post 112 in two arrays 118, 120. Each array 118, 120 includes at least one LED 116 secured to each outside surface 117 of the support post 112 forming a plurality of radial light emitters. The LEDs of each array are positioned at substantially the same axial distance along the support post 112 so the LEDs 116 of each array 118, 120 have substantially the same relationship to the reflector surface. Each of the LEDs has its optical axis $B_2$ perpendicular to the longitudinal axis $B_1$ of the support post 112.

Figures 8, 9, 10:
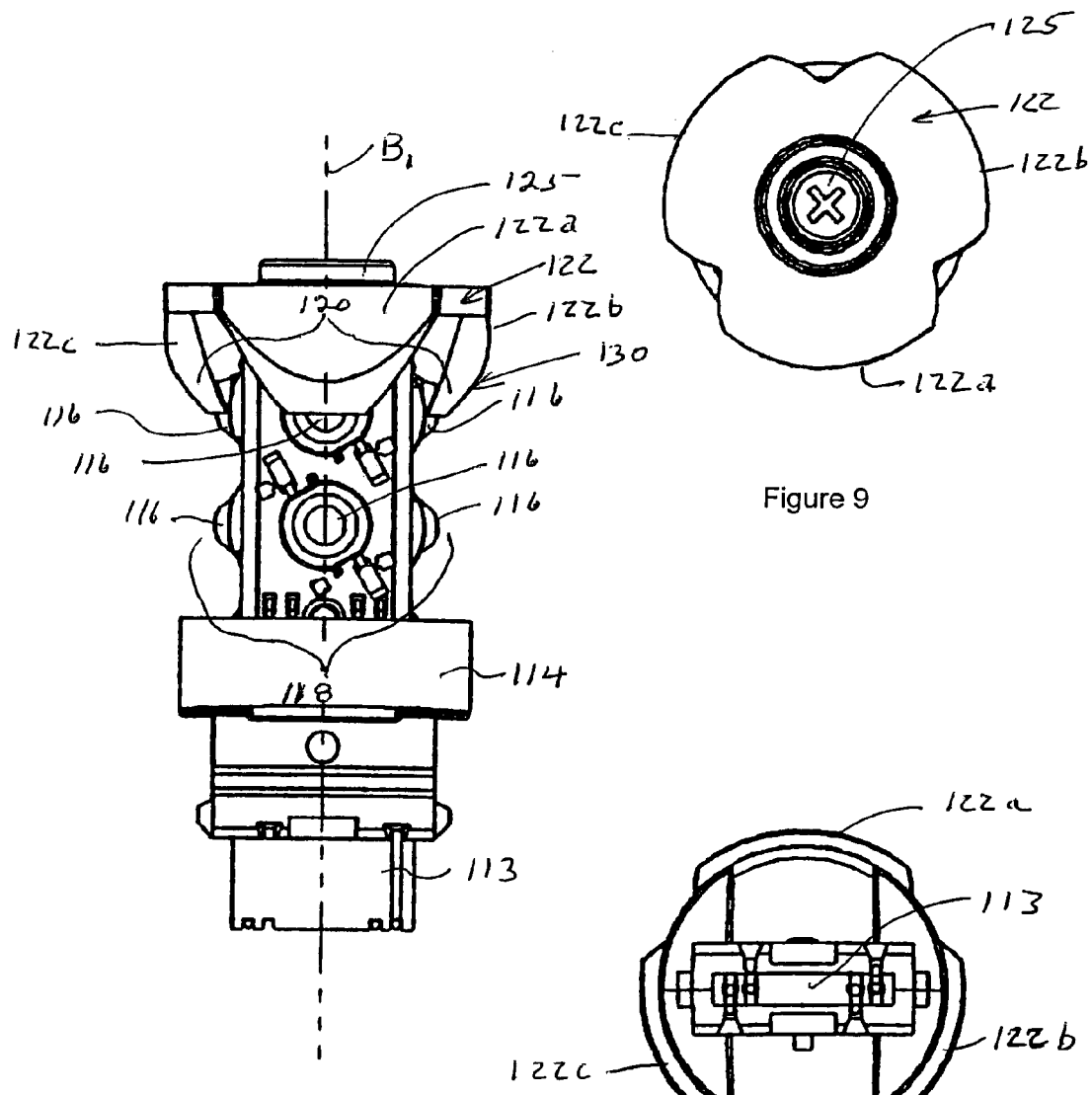
FIG. 8 is a side view of the integrated lamp of FIG. 7.
FIG. 9 is a top view of the integrated lamp of FIG. 7.
FIG. 10 is a bottom view of the integrated lamp of FIG. 7.
Figure 11:
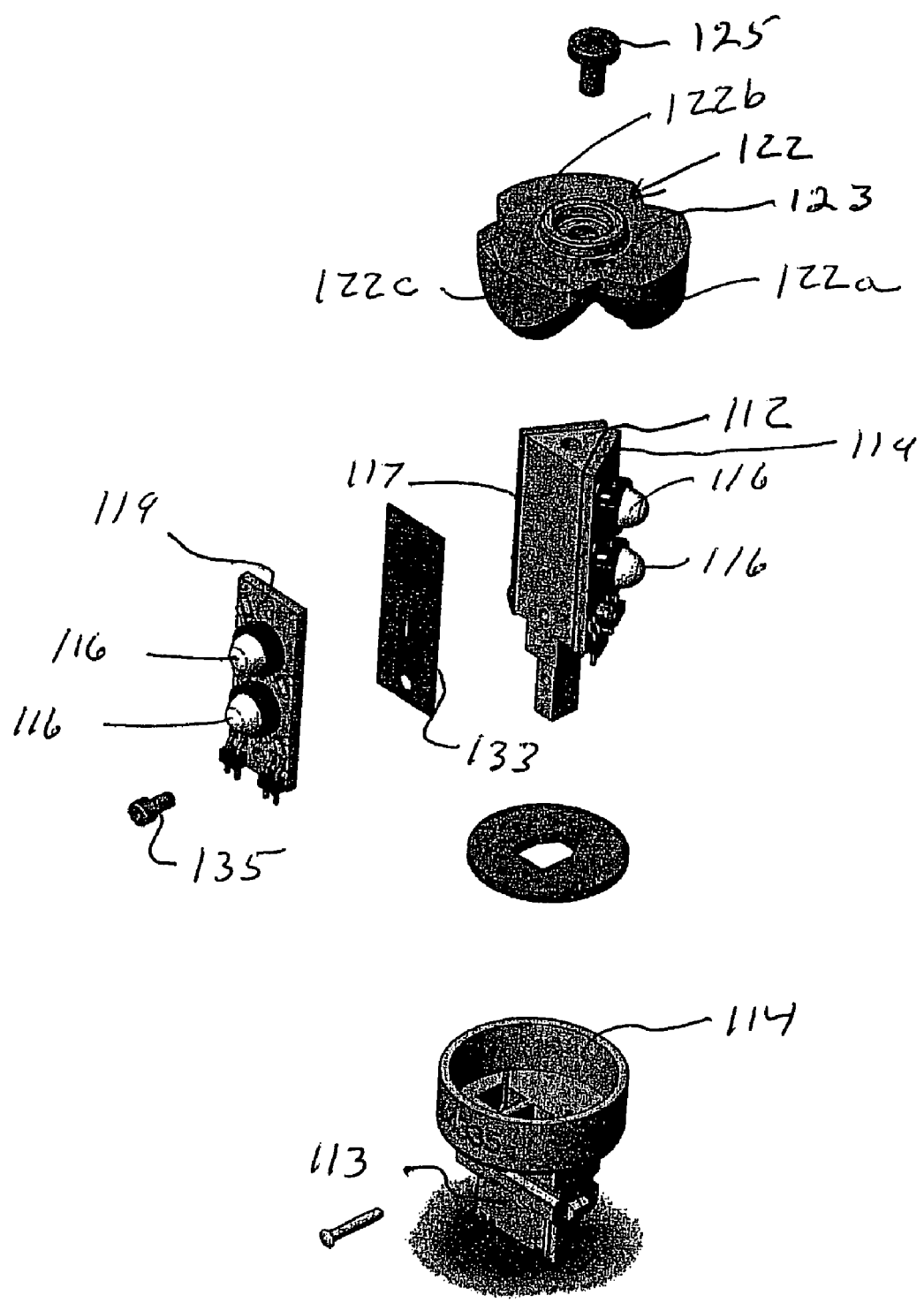
FIG. 11 is a partial exploded view showing the various components of the integrated lamp of FIG. 7.

The three LEDs 116 of array 120 are energized to generate a warning light signal. According to this aspect, each LED 116 in array 120 is partially covered by a lens 122 member. The lens member 122 includes three lobes 122a, 122b, 122c extending from a base portion 123 toward the base of the 114 of the integrated lamp 110. The lens member 122 is affixed to the support post 112 by a screw 125 or other suitable fastener extending through the base portion 123 into the outer end of the support post 112. Each lobe 122a, 122b and 122c is configured to extend partially over a portion of an associated LED 116 in array 120 as shown in FIG. 8. The outer surfaces of lobes 122a, 122b and 122c may be truncated while maintaining a cylindrical periphery as indicated at 127 in FIG. 7 to configure the lamp 110 for insertion into a reflector shell 190 without modification to the shell.

Each lobe 122a, 122b, 122c serves as an individual lens for an associated LED 116 and is configured to re-direct a portion of the light generated by an LED 116 to a direction substantially parallel to the axis $B_1$ of the support, or substantially perpendicular to the optical axis $B_2$ of the LED. Each lobe 122a, 122b, 122c includes a refracting surface 124, including a semi cylindrical portion and a convex portion, partially defining a cavity 125 into which a portion of an associated LED 116 is received. The semi cylindrical portion may flare outwardly from its first inner end to its second outer end. The refracting surface 124 is configured to refract light from its associated LED 116 into its associated lobe 122a, 122b, or 122c. Each lobe 122a, 122b, 122c also includes a reflecting surface 126 radially outward of the refracting surface 124 and positioned to reflect light refracted by the refracting surface 124 in a direction perpendicular to the optical axis $B_2$ as shown in FIG. 12. This lens configuration strengthens the straight-ahead intensity of the generated warning light signal even though no LED is oriented in that direction. See U.S. Pat. No. 7,083,313 issued Aug. 1, 2006 for a more detailed description of a lens for redirecting the light from an LED to a direction perpendicular to its optical axis, the disclosure of which patent is incorporated herein by reference in its entirety.

In the disclosed integrated lamp 110, two LEDs of the array 118 closer to the base 114 and one LED of the array 120 are dedicated to replacing the vehicle signal functions, while two LEDs of array 120 and one LED of array 118 are dedicated to generating the warning light signal. This combination of light sources affords each of the vehicle signaling patterns and warning light signals adequate photometric power in a forward and radial direction.

The dashed line 180 in FIG. 12 indicates an approximate focal distance defined by the reflecting surface 194 of the reflector shell 190. An aspect of the present disclosure relates to placement of the LED arrays 118, 120 as close to the focus F of the reflector shell 190 as possible. In the context of this embodiment, the inner LED array 118 is placed at the focal distance 180 of the reflector shell 190. The outer LED array 120 is located slightly beyond the focal distance 180 of the reflector shell. This produces a light-emitting pattern as shown in FIG. 12.

Figure 13:
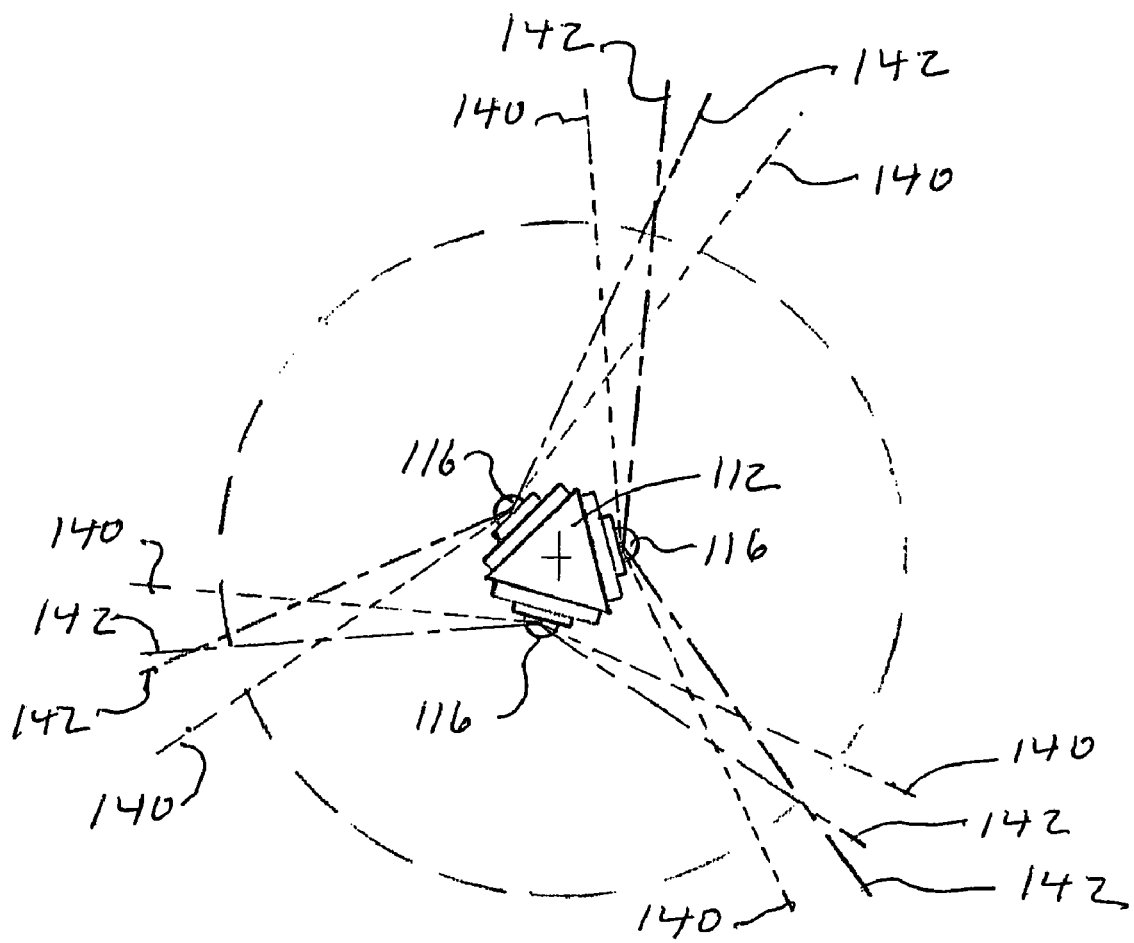
FIG. 13 is schematic view looking inwardly from the end of the integrated lamp of FIG. 7 mounted in a reflector and showing the overlap of the emitted light.

FIG. 13 shows the optical characteristics of three LEDs 116 mounted on the triangular post 112. The first set of dashed lines 140 represents the total included angle, which is the angle at which 90% of the total luminous flux is captured. The second set of dashed lines 142 represents the viewing angle, which is the angle from the lamp centerline where the luminous intensity is one-half of its peak value. As shown in FIG. 13, both of these angles from one lamp 116 overlap those of an adjacent lamp 116. The overlapping light emission patterns of the LEDs provide a substantially uniform distribution of light over 360° surrounding the lamp support.

The each LED in array 120, in combination with a lobe 122a, 122b, 122c of lens member 122 form an illumination configuration 130. Each illumination configuration 130 generates some light directed generally forward or aligned with the longitudinal axis $B_1$ of the lamp support and some light directed toward the reflector shell 190 as shown in FIG. 12. In the disclosed embodiment 110, each function of the integrated lamp is provided at least one illumination configuration 130 to reinforce the photometric power of the light pattern in a forward direction in the center of the reflector shell 190.

The illustrated embodiments 10, 110 show lenses 50, 122 arranged to collimate at least some of the light generated by an LED in a direction parallel to the longitudinal axis $B_1$ of the lamp support 12, 112. Generally speaking this collimating function could be accomplished using an appropriately configured reflector. In the case of lens 50, the reflector would take a concave, circular form. The concave circular reflector could have a parabolic shape with the point of light emission of LED 40' at the focus of the parabola. In the case of integrated lamp 110, a reflector configured to replace lens member 122 would take the form of partial parabolic reflecting surfaces positioned where the internal reflecting surfaces 126, 127 are shown in FIG. 12.

Two LEDs of array 120 and one LED of array 118 produce a warning light signal when energized in a selected pattern at current levels equal to or slightly above the maximum rated current $I_{max}$ for the LEDs. $I_{max}$ is typically between approximately 350 mA and 450 mA for a one-watt LUXEON® emitter depending on the color and batch. The LEDs are mounted with their slugs in heat-transmissive relationship to heat-conductive PC boards 119. Heat transmissive gaskets 133 may be provided between the PC boards 119 and the lamp support post 112 as shown in FIG. 8. Each PC board 119 with its attached LEDs 116 and associated gasket 133 is secured to the lamp support post 112 in heat-transmissive relationship at one end near the base by a suitable fastener such as a screw 135. Lens member 122 is configured to hold the outer end of the three PC boards 119 against the lamp support 112. This arrangement removes heat from the LEDs 116 efficiently, preventing overheating, and allowing the application of maximum current to the LEDs.

It will be understood by those of skill in the art that the power requirements for the LEDs 116 of the integrated lamp 110 may be quite different from the power applied to the vehicle lamp being replaced. Further, modern vehicles may sense the presence or absence of continuity through the filament(s) of the vehicle lamp to provide indications of lamp malfunction. Therefore, it will likely be necessary to provide an interface electrical circuit between the integrated lamp 110 and the relevant vehicle electrical systems. The interface electrical circuit will modify vehicle power to the proper voltage and current for the LEDs. The interface electrical circuit may also mimic a properly functioning vehicle lamp to avoid spurious indications of lamp malfunction. The interface electrical circuit is responsive to the vehicle signaling systems that energized the vehicle lamp. To the vehicle, the integrated lamp 110 will appear and behave identically to the vehicle lamp being replaced.

A portion of the LEDs 116 may be electrically connected to the relevant vehicle systems via an interface electrical circuit 60 (See FIG. 6). The interface electrical circuit 60 responds to the vehicle systems to provide an appropriate energizing current to the LEDs in a pattern to reproduce the relevant vehicle signal. For example, to reproduce a turn signal, the LEDs are provided with maximum current $I_{max}$ in an equally timed on/off sequence. To reproduce running lights, the LEDs are continuously energized at a less than maximum current. To reproduce a brake signal, the LEDs 16 are provided with maximum current for as long as the brake signal is transmitted from the relevant vehicle system. Applying continuous lower current with intermittent maximum current to the LEDs 116 can reproduce two concurrent functions, such as running and brake lights. If necessary, a less than maximum current may be applied to the LEDs of outer array 120 to augment the intensity and distribution pattern of the inner array 118 to meet the standards for the relevant vehicle signal.

There are a variety of ways to construct the electrical circuitry and connections to coordinate the light signals generated by the integrated lamp 110 with the light signals of the other integrated lamps and relevant vehicle systems. The integrated lamp 110 of this second embodiment may be used in place of the lamps 10 in the system shown in FIG. 6. FIG. 6 illustrates an integrated vehicular lamp and warning signal light system 100 in which each integrated lamp 110 is provided with its own warning signal electrical circuit 74. The individual warning signal electrical circuits may comprise a microcontroller programmed with one or more warning light signal patterns and the circuitry necessary to generate energizing current to produce the relevant warning light signal. The warning signal electrical circuits 74 will typically be configured to generate the same or complementary warning light signals when energized. FIG. 6 shows a synchronizing electrical connection 84 between the several integrated lamps 110. Such a synchronizing electrical connection 84 can be employed to coordinate the timing of the warning light signals generated by the integrated lamps 110. Alternatively, the integrated lamps 110 may be permitted to generate their warning light signals without reference to the signals generated by the other integrated lamps 110. The integrated lamps 110 of FIG. 4 are also provided with interface electrical circuits 60.

Figure 14:
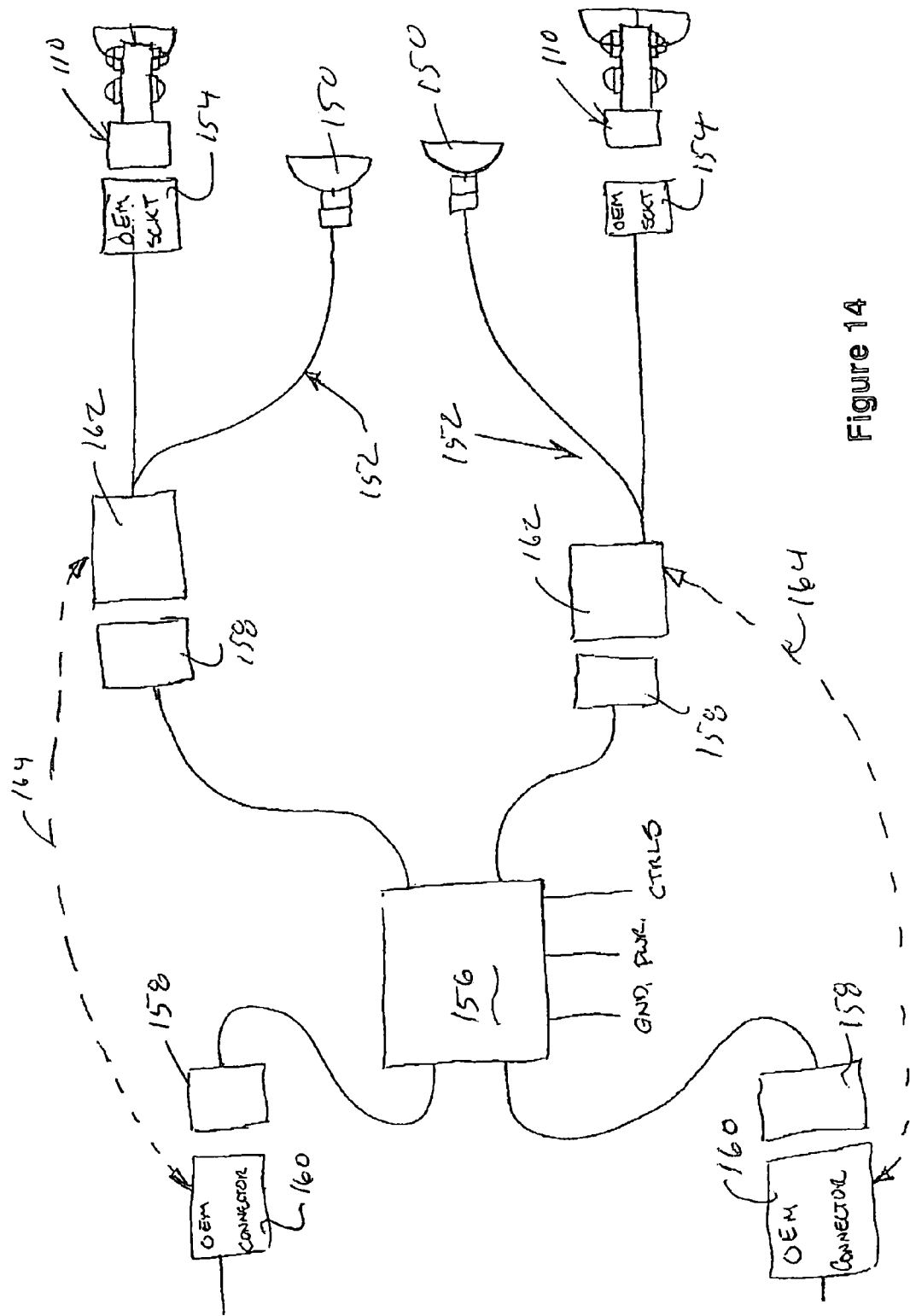
FIG. 14 is a functional block diagram of an integrated vehicular lamp and warning device as retrofitted into an existing system.

Another aspect of incorporating the integrated lamp 110 into a vehicular lighting system is shown in FIG. 14, in which the lamps are retrofitted into the vehicle system. As shown in this Figure, an integrated lamp 110 replaces the right and left side lamps of the vehicle while the headlight lamps 150 are unchanged. The preexisting wiring harness, OEM harness 152 is operatively connected to the lamps 110 through the OEM socket 154. The OEM harness 152 is also connected to the headlight lamps 150. An interface control 156 with connectors 158 is interposed between the OEM connectors 160 from the vehicle function and the connectors 162 of the OEM harness 152. In normal use, without the use of the lamps 110, the vehicle function connectors 160 would be directly connected to the connectors 160 of the OEM harness as shown by the dotted lines 164. The interface control 156 may include or otherwise be operatively connected to, an appropriate power source, microcontroller and control circuitry.

Exemplary embodiments illustrating the structure for an integrated lamp, electrical circuitry and system arrangements are described for purposes of explanation and are not intended as limitations. While preferred embodiments have been shown and described, various modifications and substitutes may be made thereto. Accordingly, it is to be understood that the present embodiments have been described by way of illustration and not limitation.

What is claimed is:

1. A lamp assembly comprising:

a base;

a lamp support defining a longitudinal axis and extending from said base, said lamp support having an outside surface;

a plurality of light emitting diodes each having an optical axis, a first portion of said plurality of light emitting diodes secured to the outside surface of said lamp support with their optical axes substantially perpendicular to said longitudinal axis and emitting light about their optical axis, and a second portion of said plurality of said light emitting diodes arranged to produce at least some light substantially aligned with said longitudinal axis, wherein said second portion comprises at least one light emitting diode provided with a collimator arranged to re-direct a portion of the light generated by said at least one light emitting diode in a direction aligned with said longitudinal axis.

2. The lamp assembly of claim 1, wherein said second portion comprises at least one light emitting diode mounted to said lamp support with its optical axis aligned with said longitudinal axis.

3. The lamp assembly of claim 1, wherein said collimator is a lens.

4. The lamp assembly of claim 1, wherein said plurality of light emitting diodes are arranged in two arrays, the light emitting diodes in each said array substantially equidistant from said base and positioned to emit light in a pattern surrounding said lamp support post.

5. The lamp assembly of claim 4, wherein at least one light emitting diode in each array is energized simultaneously with at least one light emitting diode in the other array.

6. The lamp assembly of claim 4, wherein the light emitting diodes in each array are energized simultaneously and the arrays of light emitting diodes are energized separately.

7. The lamp assembly of claim 1, wherein said outside surface comprises a plurality of substantially flat sides, each of said flat sides having at least one light emitting diode secured thereto.

8. The lamp assembly of claim 1, wherein said lamp support is a regular polygon in section, said regular polygon having a plurality of substantially planar sides defining said outside surface, each of said sides having at least one radial light emitter affixed thereto.

9. The lamp assembly of claim 1, wherein said lamp support post is square in section, said outside surface comprises four substantially planar longitudinally extending faces and said plurality of radial light emitters comprise two axially spaced arrays of LEDs, each array of LEDs including an LED mounted to each said face and aligned with the other LEDs in the array.

10. A lamp assembly comprising:
a base;
a support post extending from said base defining a longitudinal axis and having an outside surface;
a plurality of radial light emitters, each having an optical axis and secured to the outside surface of the support with their optical axes substantially perpendicular to said longitudinal axis, each said radial light emitter producing light when energized in a symmetrical pattern about said optical axis; and
a lens constructed and arranged to redirect a portion of the light emitted from at least one of said radial light emitters in a direction that is substantially parallel to said longitudinal axis.

11. The lamp assembly of claim 10, wherein said lens covers a first portion of at least one said radial light emitter, leaving a second portion of said at least one radial light emitter uncovered, said second portion being axially intermediate said first portion and said base.

12. The lamp assembly of claim 10, wherein said lens includes a refracting surface partially defining a cavity and a reflecting surface radially outward of said refracting surface.

13. The lamp assembly of claim 10, wherein said plurality of radial light emitters includes an array of radial light emitters equidistant from said base and positioned to emit light in a pattern substantially surrounding said support post.

14. The lamp assembly of claim 10, wherein said plurality of radial light emitters includes an array of radial light emitters equidistant from said base and positioned to emit light in a pattern substantially surrounding said support post,
wherein said lens is constructed and arranged to re-direct a portion of the light emitted from each of the radial light emitters in said array.

15. The lamp assembly of claim 10, wherein said plurality of radial light emitters includes an array of radial light emitters equidistant from said base and positioned to emit light in a pattern substantially surrounding said support post,
wherein said lens is constructed and arranged to re-direct a portion of the light emitted from each of the radial light emitters in said array and said radial light emitters in the array are simultaneously energized.

16. The lamp assembly of claim 10, wherein said radial light emitters are LEDs.

17. The lamp assembly of claim 10, wherein said support post comprises a plurality of substantially flat sides defining said outside surface, each of said flat sides having at least one radial light emitter and one lens associated therewith.

18. The lamp assembly of claim 10, wherein said plurality of radial light emitters include a first array of radial light disposed equidistant from the base and a second array of radial light emitters disposed equidistant from said base and intermediate the first array and the base, and
wherein said lens is constructed and arranged to re-direct a portion of the light emitted from each of the radial light emitters in said first array.

19. The lamp assembly of claim 10, wherein the outside surface of said support post consists essentially of three substantially planar sides, and said plurality of radial light emitters include a first array of LEDs disposed equidistant from the base and a second array of LEDs disposed equidistant from said base and intermediate the first array and the base.

20. The lamp assembly of claim 10, wherein said support post is substantially triangular in section and said plurality of radial light emitters comprising a first array of LEDs disposed equidistant from the base and a second array of LEDs disposed equidistant from the base and intermediate the first array and the base, wherein the LEDs in each array are energized simultaneously and each array is energized separately.

21. The lamp assembly of claim 10, wherein said support post comprises a plurality of substantially planar sides; said plurality of radial light emitters comprises a first array of LEDs secured to said outside surface at a first distance from the base and a second array of LEDs secured to said outside surface at a second distance from said base, said second array intermediate said first array and said base, each said array comprising one LED secured to each side of said support post.

22. The lamp assembly of claim 10, wherein said lens comprises:
a light entry surface partially defining a cavity, said light entry surface comprising a semi cylindrical portion and a convex portion; and
a concave internal reflecting surface radially spaced from said light entry surface and positioned to redirect light passing through said light entry surface, said internal reflecting surface flaring outwardly from a first to a second end, and wherein said lens covers at least a portion of one of said plurality of radial light emitters.

23. The lamp assembly of claim 10, wherein said lens is a side-emitting collimating lens.

24. A lamp assembly comprising:
a base;
a support post extending from said base defining a longitudinal axis and having an outside surface;
a first array of LEDs equidistant from said base;
a second array of LEDs intermediate to said first array, the LEDs in the first and second array each having an optical axis and being secured to the outside of the support with its optical axis substantially perpendicular to said longitudinal axis, the LEDs producing light when energized in a symmetrical pattern about said optical axis;

a plurality of side emitting collimating lenses covering at least a portion of said first array of LEDs equidistant from said base arranged to redirect a portion of the light emitted from at least one of the LEDs of said first array in a direction that is substantially parallel to said longitudinal axis.

25. The lamp assembly of claim 24 wherein each of said first and second array of LEDs include three LEDs spaced circumferentially about the axis of the support post in a plane perpendicular thereto.

26. The lamp assembly of claim 25 wherein said LEDs have their optical axes perpendicular to the longitudinal axis of said support post.

* * * * *